US012682059B2

(12) United States Patent
Kleymenov et al.

(10) Patent No.: US 12,682,059 B2
(45) Date of Patent: Jul. 14, 2026

(54) METHOD FOR AUTOMATIC STORING OF MALICIOUS SAMPLES

(71) Applicant: Nozomi Networks Sagl, Mendrisio (CH)

(72) Inventors: Alexey Kleymenov, Massagno (CH); Alessandro Di Pinto, Malnate (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 544 days.

(21) Appl. No.: 18/066,377

(22) Filed: Dec. 15, 2022

(65) Prior Publication Data

US 2024/0202334 A1     Jun. 20, 2024

(51) Int. Cl.
| | |
|---|---|
| *G06F 21/56* | (2013.01) |
| *G06F 16/13* | (2019.01) |
| *G06F 16/16* | (2019.01) |
| *G06F 16/22* | (2019.01) |
| *G06F 16/23* | (2019.01) |
| *H04L 9/06* | (2006.01) |

(52) U.S. Cl.
CPC .......... *G06F 21/566* (2013.01); *G06F 16/137* (2019.01); *G06F 16/164* (2019.01); *G06F 16/2255* (2019.01); *G06F 16/2379* (2019.01); *G06F 21/562* (2013.01); *H04L 9/0643* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2013/0167236 A1* | 6/2013 | Sick | .................. | G06F 21/56 |
| | | | | 726/24 |
| 2015/0046450 A1* | 2/2015 | Yoshino | .............. | G06F 16/7837 |
| | | | | 707/736 |
| 2017/0005803 A1* | 1/2017 | Brownewell | ......... | G06F 16/248 |
| 2020/0301888 A1* | 9/2020 | Montgomery | ........ | G06F 16/128 |
| 2020/0351094 A1* | 11/2020 | Canterbury | ........... | H04L 9/0637 |
| 2021/0021612 A1* | 1/2021 | Higbee | ............... | H04L 63/1416 |
| 2021/0058251 A1* | 2/2021 | Varadharajan | ........ | H04L 9/0643 |
| 2021/0081813 A1* | 3/2021 | Cecchi | .................. | G16H 20/70 |
| 2022/0012230 A1* | 1/2022 | Miyamoto | ............ | G06F 16/122 |
| 2023/0169176 A1* | 6/2023 | Lee | .......................... | G06N 3/08 |
| | | | | 726/26 |

* cited by examiner

*Primary Examiner* — Thu N Nguyen
(74) *Attorney, Agent, or Firm* — Jason L DeFrancesco

(57) ABSTRACT

The present invention relates to a method for automatically storing malicious samples, comprising collecting input samples from sample providers relating to malwares and goodwares, parsing each of the input samples to extract metadata relating to each of said input sample, adding the metadata relating to each of said input sample in a metadata database, storing each of the input sample in a sample storage, wherein the adding comprises converting the original hashes of each of the input samples to SHA256 hashes according to a hash mapping table operatively connected to the metadata database, and wherein the storing comprises defining the filename of each of the input samples equal to the corresponding SHA256 hash.

8 Claims, 1 Drawing Sheet

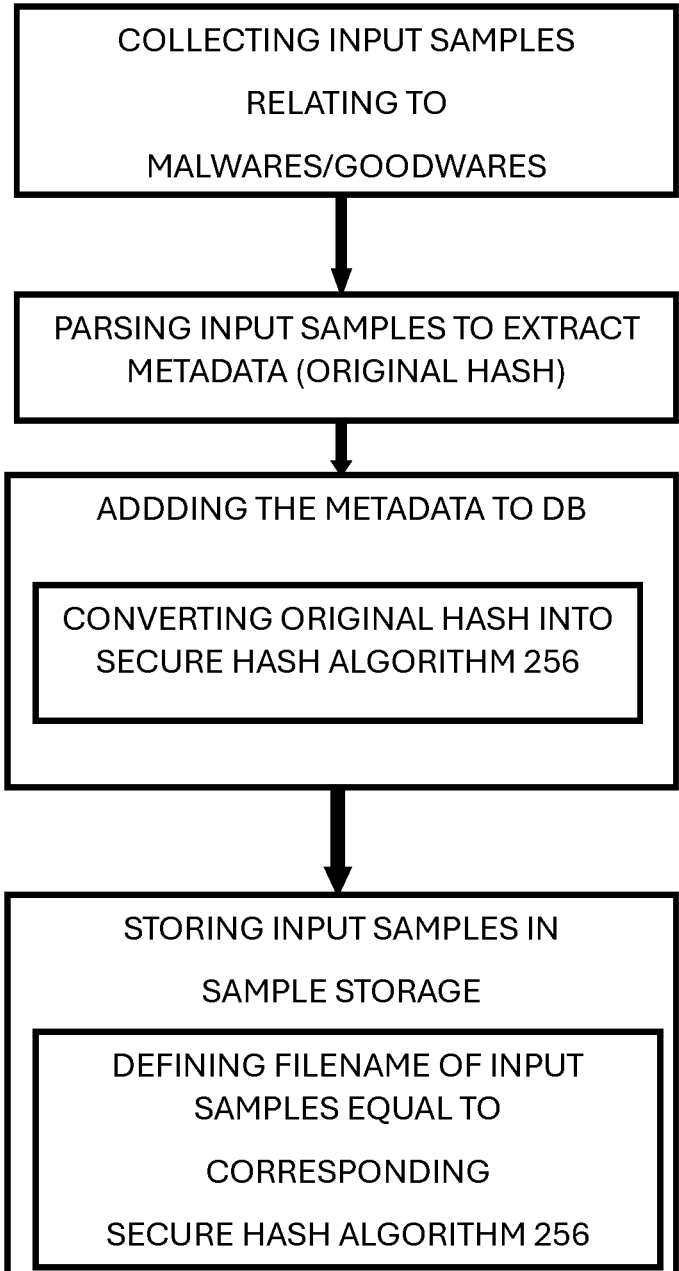

METHOD FOR AUTOMATIC STORING OF MALICIOUS SAMPLES

FIELD OF INVENTION

The present invention relates to the field of security management of infrastructures, such as automation systems and industrial production systems.

In particular, the present invention relates to a method for automatic storing of malicious samples.

BACKGROUND ART

With the rise of the Internet economy, malwares are used and are increasing to damage systems as well as to drain money. Security products of known type detect malicious attacks and sometimes are also able to take action to prevent them, by making use of known malwares.

The known methods of determining a signature for each new malware has been shown to be unscalable, since there are no clean-cut rules for generically distinguishing malware from cleanware.

Moreover, cloud computing requires real-time, timely responses of the anti-malware analysis system, wherein knowing whether a packet is malicious or not is urgent.

However, the performance of the analysis system relies heavily on the techniques adopted to classify and to store malwares. Beside the kind of extraction employed, such as a static extraction and/or a dynamic extraction, the raising malwares becoming known are used to test the systems or to raising alerts when identified in a communication.

It would therefore be desirable to address samples in a way to result of easy access for the identification of malwares and cleanwares.

BRIEF DESCRIPTION OF THE INVENTION

The object of the present invention is to provide a method for automatic storing of malicious samples capable to store all malicious samples extracted in a unified way to enable efficient search and automated read and write access.

According to the present invention is described, therefore, a method for automatically storing malicious samples, according to the appended claims.

The method comprises:
- collecting, by a computerized data processing unit, input samples from sample providers relating to malwares and goodwares;
- parsing, by the computerized data processing unit, each of the input samples to extract metadata relating to each of the input sample;
- adding, by the computerized data processing unit, the metadata relating to each of said input sample in a metadata database;
- storing, by the computerized data processing unit, each of the input sample in a sample storage;

wherein the adding comprises converting the original hashes of each of the input samples to Secure Hash Algorithm 256 ("SHA256") [SHA256] hashes according to a hash mapping table operatively connected to the metadata database, and wherein the storing comprises defining the filename of each of the input samples equal to the corresponding SHA256 hash.

The method according to the present invention allows, therefore, to store all collected malicious samples in a unified way to enable efficient search and automated read and write access.

In particular, the method according to the present invention has the ability to accept any hash type as an input, which is then converted to SHA256, as well as to use the unified SHA256 hash type to as uniform filename of the malicious samples stored.

BRIEF DESCRIPTION OF THE DRAWINGS

FIG. 1 illustrates a schematic flow diagram of an embodiment of the method for automatically storing malicious samples according to the present invention, showing the steps of collecting input samples, parsing metadata, converting original hashes to SHA256 hashes, adding metadata to a database, storing the samples in a storage system, and defining the filename of each stored sample based on the corresponding SHA256 hash.

DETAILED DESCRIPTION OF THE INVENTION

The present invention relates to a method for automatically storing malicious samples from a plurality of sample providers. In particular, the method according to the present invention found useful application in physical or IT infrastructures.

With the method of the present invention it is possible to collect samples, such as of malware or goodware type, from multiple systems or sources. In this way it should be possible to issue automatic identification and storing based on such collected samples and, eventually, search and retrieve them.

A malware is any software intentionally designed to cause disruption to a computer, server, client, or computer network, leak private information, gain unauthorized access to information or systems, deprive access to information, or which unknowingly interferes with the user's computer security and privacy.

Many types of malwares exist, including computer viruses, worms, Trojan horses, ransomware, spyware, adware, rogue software, wiper, and scareware. The defense strategies against malware differ according to the type of malware but most can be thwarted by installing antivirus software, firewalls, applying regular patches to reduce zero-day attacks, securing networks from intrusion, having regular backups and isolating infected systems.

The method for automatically storing malicious samples (FIG. 1), according to the present invention, comprising first collecting, by a computerized data processing unit, input samples from sample providers relating to malwares and goodwares. As an example, input samples can be part of a previous owned database, can be detected by specific signatures, can be downloaded from VirusTotal (the website "www.virustotal.com" which aggregates many antivirus products and online scan engines) or can be manually submitted. Both malware and goodware being possible, the input samples as collected need to be identified to allow a better classification.

In this regard, the method according to the present invention comprises parsing, by the computerized data processing unit, each of the input samples to extract metadata relating to each of the input sample. The metadata will correspond to the hash type value for both malware and goodware, while will comprise more for malwares as described in greater details below. A hash function is any function that can be used to map data of arbitrary size to fixed-size values. The values returned by a hash function are called hash values or simply hashes. There are many cryptographic hash algorithms, such as MD5, SHA-1, RIPEMD-160, SHA-256.

Therefore, the method according to the present invention comprises adding, by the computerized data processing unit, the metadata relating to each of the input sample in a metadata database. In particular, the adding comprises converting the original hashes of each of the input samples to SHA256 hashes according to a hash mapping table operatively connected to the metadata database. Further metadata can be parsed and added when the input sample relate to a malware, as described for specific embodiment below as taken alone or in combination between them. This allows to efficiently search for samples of interest based on their metadata when needed. The system according to the present invention may also comprise Application Programming Interfaces ("APIs") to search for and download/upload samples based on extracted metadata. Moreover, the system according to the present invention also support encryption to not trigger security systems.

All metadata is stored in a single metadata Database ("DB") (PostgreSQL), allowing to quickly search for files by its characteristics. It is extracted automatically by dedicated parsers once the sample is submitted.

In an embodiment, the parsing comprises retrieving as metadata the platform and architecture details for each of the input samples which defines an executable. Moreover, the adding comprises filling the platform and architecture fields of the metadata database with the platform and architecture details. In this regard, the metadata database can comprise a table called platform and a further table called architecture. In particular, the platform table can have as main field the support platforms (such as, Windows, Linux, BSD, MacOS, iOS, Android, etc).

Moreover, the architecture table can have as main field the supported architectures (such as, x86, arm, mips, sh4, ppc, sparc, m68k, arc, etc).

In an embodiment, the parsing comprises retrieving as metadata the malware family details for each of the input samples. Moreover, the adding comprises filling the malware family fields of the metadata database with the malware family details. In this regard, the metadata database can comprise a table called file category. In particular, the file category table can have as main field the supported file category (such as, executables, bundle, web, document, archive, script, etc).

In an embodiment, the parsing comprises retrieving as metadata the filetype details for each of the input samples. Moreover, the adding comprises filling the filetype fields of the metadata database with the filetype details. In this regard, the metadata database can comprise a table called filetype. In particular, the filetype table can have as main field the supported file type (such as, pe, elf, mach-o, msi, pkg, jar, apk, doc, docx, xls, xlsx, ppt, pptx, rtf, pdf, zip, rar, 7z, Tar, gzip, bzip2, xz, js, vbs, powershell, python, perl, bat, sh, html, etc).

In an embodiment, the parsing comprises retrieving as metadata In The Wild ("ITW") filenames for each of the input samples. Moreover, the adding comprises filling the ITW filename fields of the metadata database with the ITW filenames. In this regard, the metadata database can comprise a table called filename. In particular, the filename table can have as main field the filename description (such as, the original filename).

In an embodiment, the parsing comprises retrieving as metadata the hash details for each of the input samples. Moreover, the adding comprises filling the hash fields of the metadata database with the hash details. In this regard, the metadata database can comprise a table called sample. In particular, the sample table can have as main fields the description of the md5 (such as, a unique Identifier ("ID") for each sample), the description of the sha1 (such as, a SHA-I hash of the sample) and the description of the sha256 (such as, a SHA-256 hash of the sample).

In an embodiment, the metadata database can comprise a table called bitness. In particular, the bitness table can have as main field the supported values of bitness (such as, 32, 64, etc).

The method according to the present invention further comprises storing, by the computerized data processing unit, each of the input sample in a sample storage—In particular, the storing comprises defining the filename of each of the input samples equal to the corresponding SHA256 hash. The key part of it is an ability to accept any hash type as an input, which will be converted behind the scenes to SHA256 thanks to the hash mapping table, part of the metadata DB. Their filenames are equal to their SHA256 hashes to allow quick search by sample's digest (hash). In this regard, the metadata database can comprise a table called mapping. In particular, the mapping table can have as main fields the sample ID (such as, a unique ID for each sample), the architecture ID (such as, the corresponding architecture), the bitness ID (such as, the corresponding architecture bitness), the platform ID (such as, the corresponding platform), the file type ID (such as, the corresponding file type), the file category ID (such as, the corresponding file category), the detection ID (such as, the corresponding detection) and the filename ID (such as, the corresponding filename(s)).

The method for automatically storing malicious samples further comprises updating said hash mapping table at predetermined time intervals. This allows to have a hash mapping table constantly updated, preferably automatically.

In an embodiment, the storing comprises retrieving as metadata the hash details for each of the input samples. In particular, the adding comprises filling the hash fields of the metadata database with said hash details.

According to a further embodiment the storing comprises arranging the input sample relating to malwares in a malware sample storage and the input sample relating to goodwares in a goodware sample storage separated from the malware sample storage. In this case, all samples are stored flat in a single directory on two different storages (such as Amazon Web Services Simple Storage Service ("AWSS3") buckets, but further options can be used), one for cleanware (goodware) and one for malware to not mix them up. The main reason is that cleanware is commonly used to periodically scan with signatures to make sure there are no False Positives so that it makes sense to keep it separately from malware. It is important to support encryption during malware transfer as otherwise it may trigger alerts of security systems.

An example of input sample submission is herewith summarized.

For malware, a backend automatically extracts all the required metadata and pushes it to the DB. For both malware and goodware, the samples are placed preferably to the AWS S3 storage.

Request format: POST/submit/sample?detection= <detection>&goodware=<true|false>&encrypted= <true|false>. The file should be passed using the file field.

The optional <detection> value follows the same format as the middle part of signature filenames: [(<actor>)]<family_name>. This field is ignored if the goodware value is set to true. If the detection value is not provided, the Unknown placeholder is used.

If the optional goodware or encrypted values are not provided, the false placeholder is used.

The only supported way to encrypt the samples is ZIP archives with infected password, one sample per archive without any subdirectories allowed. If it doesn't help and the archive is still detected in the middle, try to rename files to their SHA2 values before archiving them.

Example:

curl -F "file=@sample.bin" 'http: <host>:5000 submit sample?detection=AgentTesla'

Return values:

OK—successful submission

DUPLICATE—the sample already exists in the storage

MASSIVE—the file is too big to be submitted (>100 Mb)

BADARCH—there is a problem with an archive (examples: the submitted object was not an archive, the incorrect password was used, there was more than one sample or some subdirectories inside)

ERROR—a custom backend error, see logs for more information.

An example of input sample retrieval is herewith summarized.

Request format: GET/download/sample?hash= <md5|sha1|sha2>&encrypt=<true|false>

For malware, multiple types of hashes are supported (the conversion is done using the metadata DB) so that the preliminary conversion is not required. For goodware, only SHA256 hashes are supported at this stage.

If the optional encrypt value is set to true, the file will be compressed with ZIP algorithm and a standard password infected. If the encrypt value is not provided, the false placeholder is used.

Example:

wget 'http://<host>:5000/download sample? hash=d16fb36f0911f878998c136191af705e'

Return values:

200 code and the requested file—success 404 code—file not found

An example of metadata entries is herewith summarized.

DB connection: psql -U threatintel -d adss -h 127.0.0.1

Example Query:

select md5, sha1, sha256, file_type from metadata.mapping m join metadata.sample s on m.sample_id=s.sample_id join metadata.file_type f on m.file_type_id=f.file_type_id limit 5;

Results:

1 md5|sha1

|sha256

|file_type

2-----------------------------------+---------------------------

--------------+----------------------------------------------

-------------------+-----------

3 abeab18ebae2c3e445699d256d5f5fb1|4c424d5c8cfed-f8d2164b9f833    f7c631f94c5a4c|07e726b21e27eefb-2b2887945aa8bdec116b09dbd4e1a 54e1c137ae8c7693660|pe 4    9fbdc5eca123e81571e8966b9b4e4a1e|7a5b7c5378e-0afcc77098a8735    8e4f6a032d3b00|dce2d575bef07-3079c658edfa872a15546b422ad2b742        67d33b3-86dc7cc85b47|pe d6751b148461e0f863548be84020b879|bab1d2c668e-597d19f9ee93959 44c1ce0f34f279|1aa4ad5a3f8929d-61f559df656c84326d1fe0ca82a4be        299fa758a26-e14b1b27|pe 6    311f24eb2dda26c26f572c727a25503b|74e12fbca-c14b2f1b2d83cabb0 57f8e059c95d68|01bca6481a3a-55dc5de5bfa4124bba47d37018d8ee93e    5dbb80a60-a14f243889|pe 7    c2e1f2cf18ca987ebb3e8f4c09a4ef7e|e757ea599a1 d6f1d06d90589d7    f19dd1c1bf8b7b|5b52bc196bfc-207d43-  eedfe585df96fcfabbdead087ff  79fcdcdd4d-08c7806db|pe An example of input sample search is herewith summarized. The system should be able to receive a JavaScript Object Notation ("JSON") dictionary with search parameters describing characteristics of samples of interest. The API should return a list of SHA256 hashes matching the query provided. This list can then be used to retrieve the actual sample bodies using other above-mentioned APIs.

Request format: POST/jind/sample? goodware= <true|false>

Return values: list of hashes (SHA256).

The present invention therefore provides a method to store malicious samples in a unified way capable of minimizing the aforementioned drawbacks. In particular, the present invention provides a method capable to allow high proactivity in protecting customers from emerging threats, enabling efficient search and automated read and write access.

The invention claimed is:

1. A method for automatically storing malicious samples, comprising the steps of:

collecting, by a computerized data processing unit, input samples from sample providers relating to malwares and goodwares;

parsing, by said computerized data processing unit, each of said input samples to extract metadata, including an original hash, relating to each of said input sample;

adding, by said computerized data processing unit, said metadata relating to each of said input sample in a metadata database;

storing, by said computerized data processing unit, each of said input sample in a sample storage;

wherein said adding comprises converting the original hashes of each of said input samples to Secure Hash Algorithm 256 ("SHA256") hashes according to a hash mapping table operatively connected to said metadata database, and wherein said storing comprises defining the filename of each of said input samples equal to the corresponding SHA256 hash.

2. The method for automatically storing malicious samples according to claim 1, wherein said parsing comprises retrieving as metadata the platform and architecture details for each of said input samples which defines an executable, and wherein said adding comprises filling the platform and architecture fields of said metadata database with said platform and architecture details.

3. The method for automatically storing malicious samples according to claim 1, wherein said parsing comprises retrieving as metadata the malware family details for each of said input samples, and wherein said adding comprises filling the malware family fields of said metadata database with said malware family details.

4. The method for automatically storing malicious samples according to claim 1, wherein said parsing comprises retrieving as metadata the filetype details for each of said input samples, and wherein said adding comprises filling the filetype fields of said metadata database with said filetype details.

5. The method for automatically storing malicious samples according to claim 1, wherein said parsing comprises retrieving as metadata In The Wild ("ITW") filenames for each of said input samples, and wherein said adding comprises filling ITW filename fields of said metadata database with said ITW filenames.

6. The method for automatically storing malicious samples according to claim 1, wherein said parsing comprises retrieving as metadata the hash details for each of said input samples, and wherein said adding comprises filling the hash fields of said metadata database with said hash details.

7. The method for automatically storing malicious samples according to claim 1, wherein said storing comprises arranging said input sample relating to malwares in a malware sample storage and said input sample relating to goodwares in a goodware sample storage separated from said malware sample storage.

8. The method for automatically storing malicious samples according to claim 1, wherein it further comprises updating said hash mapping table at predetermined time intervals.

\* \* \* \* \*